US009506501B2

United States Patent
Gövert (10) Patent No.: US 9,506,501 B2
(45) Date of Patent: Nov. 29, 2016

(54) LIGHTWEIGHT JOINT FOR TRANSMITTING ROTATIONAL MOVEMENTS

(71) Applicant: THYSSENKRUPP STEEL EUROPE AG, Duisburg (DE)

(72) Inventor: Michael Gövert, Leverkusen (DE)

(73) Assignee: THYSSENKRUPP STEEL EUROPE AG, Duisburg (DE)

( * ) Notice: Subject to any disclaimer, the term of this patent is extended or adjusted under 35 U.S.C. 154(b) by 0 days.

(21) Appl. No.: 14/438,593

(22) PCT Filed: Oct. 24, 2013

(86) PCT No.: PCT/EP2013/072311
§ 371 (c)(1),
(2) Date: Apr. 24, 2015

(87) PCT Pub. No.: WO2014/064214
PCT Pub. Date: May 1, 2014

(65) Prior Publication Data
US 2015/0292565 A1  Oct. 15, 2015

(30) Foreign Application Priority Data
Oct. 26, 2012 (DE) .......................... 10 2012 110 276

(51) Int. Cl.
*F16D 3/46* (2006.01)
*F16D 3/24* (2006.01)
*F16D 3/223* (2011.01)
*F16D 3/50* (2006.01)

(52) U.S. Cl.
CPC ................. *F16D 3/24* (2013.01); *F16D 3/223* (2013.01); *F16D 3/50* (2013.01); *F16D 2003/22309* (2013.01)

(58) Field of Classification Search
CPC ............ F16D 3/24; F16D 3/50; F16D 3/223; F16D 2003/22309; F16D 3/46
USPC ........................................ 464/141–143, 145
See application file for complete search history.

(56) References Cited

U.S. PATENT DOCUMENTS 1,568,914 A  *  1/1926  Owens .................... F16D 3/221
                                               464/141
5,160,299 A  *  11/1992  Sweeney ................ F16D 3/221
                                               464/141

(Continued)

FOREIGN PATENT DOCUMENTS

DE       1004014 B    3/1957
FR        622859 A    6/1927

(Continued)

OTHER PUBLICATIONS

German Language International Search Report for International patent application No. PCT/EP2013/072311; mailing date Jan. 31, 2014.

(Continued)

*Primary Examiner* — Gregory Binda
(74) *Attorney, Agent, or Firm* — thyssenkrupp North America, Inc.

(57) ABSTRACT

The invention relates to a connecting joint for transmitting a rotation movement from a first to a second rotating shaft, having a joint outer part, a joint central part, and a joint inner part, wherein for transmitting the rotation movement, the joint outer part is connected to the first rotating shaft and the joint inner part is connected to the second rotating shaft. A plurality of balls are provided in ball tracks, which balls in the ball tracks may change their position in relation to the joint outer part, joint central part, and joint inner part. Rotational movement of the connecting joint, by way of the balls in the ball tracks, is transmittable from the joint outer part via the joint central part to the joint inner part and vice versa.

17 Claims, 5 Drawing Sheets

(56) References Cited

U.S. PATENT DOCUMENTS 7,632,189 B2 * 12/2009 Schwarzler ............. F16D 3/223
464/145
8,033,920 B1 * 10/2011 Benson ................... F16D 3/221
464/141 X

FOREIGN PATENT DOCUMENTS

| FR | 785242 | * | 8/1935 |
| FR | 50320 E | | 3/1940 |
| FR | 998414 | * | 1/1952 |
| FR | 1410608 A | | 9/1965 |
| FR | 2316475 A1 | | 1/1977 |
| GB | 390438 A | | 4/1933 |

OTHER PUBLICATIONS

English translation of International Search Report for International patent application No. PCT/EP2013/072311; mailing date Jan. 31, 2014.
Machine English translation of FR 2316475 (A1).

\* cited by examiner

LIGHTWEIGHT JOINT FOR TRANSMITTING ROTATIONAL MOVEMENTS

CROSS REFERENCE TO RELATED APPLICATIONS

This application is a U.S. National Stage Entry of International Patent Application Serial Number PCT/EP2013/072311, filed Oct. 24, 2013, which claims priority to German patent application no. DE 102012110276.7 filed Oct. 26, 2012, the entire contents of both of which are incorporated herein by reference.

FIELD

The invention relates to a connecting joint for transmitting a rotation movement from a first to a second rotating shaft, having a joint outer part, a joint central part, and a joint inner part, wherein for transmitting the rotation movement the joint outer part is connected to the first rotating shaft and the joint inner part is connected to the second rotating shaft, and balls are provided in ball tracks, which balls in the ball tracks may change their position in relation to the joint outer part, joint central part, and joint inner part.

BACKGROUND

Constant-velocity joints, tripod joints, as well as universal joints are used to interconnect in a form-fitting manner rotation axes which do not run parallel with one another, such that the rotation movement of one axis can be transmitted to the other. These joints usually are composed of a joint outer part, a joint central part, and a joint inner part, wherein balls may be provided in ball tracks which, on the one hand, ensure for a form-fitting transmission of the rotation movement from, for example, the joint outer part to the joint central part and onward to the joint inner part and, on the other hand, make it possible for the balls to be able to change their position in relation to the joint outer part, joint central part, or joint inner part during the rotation movement. From the prior art, for example from the British patent document GB 390 438, a universal ball joint in which a ball-head shaped joint inner part, by way of balls in a ball track, is connected to a joint central part and a likewise ball-shaped joint outer part is known. The ball tracks here are implemented by inserts which are provided in the joint inner part, in the joint central part, and in the joint outer part. On the one hand, the construction of the connecting joint known from the prior art is complex and requires many machining steps for the required inserts and milled-out portions to be provided in the respective parts of the joint. On the other hand, the known connecting joint has the disadvantage that the permissible bending angle between the joint inner part and the joint outer part is comparatively modest. Moreover, the weight of the connecting joint known from the prior art is also in need of improvement. Finally, on account of the overdetermined system of the known connecting joint, play between joint inner part and joint outer part is likewise in need of improvement.

Thus, a need exists for a connecting joint for transmitting rotation movements, which on the one hand is constructed in a simpler manner and is easier to manufacture, and moreover has less play while overall having less friction.

BRIEF DESCRIPTION OF THE DRAWINGS

The present disclosure is described in detail below with reference to the attached drawing figures, wherein.

DETAILED DESCRIPTION

According to a first teaching of the present invention the object stated above is achieved by a connecting joint of the generic type in that the joint outer part, by way of balls in at least one first and one second ball track which are provided between the joint outer part and the joint central part, is pivotably mounted about a first pivot axis in relation to the joint central part, the joint inner part, by way of balls in a third and fourth ball track which are provided between the joint inner part and the joint central part, is pivotably mounted about a second pivot axis in relation to the joint central part, the first and second pivot axes have an angle of 90° in relation to one another, and balls are provided in the ball tracks, so that the rotation movement, by way of the balls in the ball tracks, is transmittable from the joint outer part via the joint central part to the joint inner part and vice versa.

In contrast to the prior art, the joint outer part, by way of a first pivot axis, is mounted so as to be pivotable in relation to the joint central part, and the joint inner part, by way of a second pivot axis which is rotated by 90° in relation to the first pivot axis, is mounted so as to be pivotable in relation to the joint central part. The provision of the two pivot axes by way of ball tracks and the balls disposed therein makes it possible for the connecting joint, in contrast to the connecting joint known from the prior art, to be constructed in a significantly simpler manner, namely having a total of only four ball tracks, and in particular for pivoting and the rotation movement to be ensured having significantly lower friction values. The arrangement of the pivot axes at an angle of 90° permits maximum freedom of movement of the two rotating shafts between which the rotation movement is to be transmitted.

According to a first embodiment of the present invention at least two balls are provided per ball track. In contrast to the use of one ball per ball track the guiding properties and play of the connecting joint are improved. As compared to a use of three balls per ball track, as is known from the prior art, the use of two balls per ball track in the case of identical path lengths of the ball tracks permits greater freedom of movement of the joint parts in relation to one another. According to a further embodiment of the connecting joint according to the invention the ball tracks are configured in such a manner that the joint outer part and/or the joint inner part are/is pivotable at least by an angle of 40° in each pivoting direction about the first and the second pivot axis, respectively. On account thereof, a very large bending angle of the connecting joint can be provided.

According to a further embodiment the connecting joint may be provided in a simple manner in that the joint outer part has regions with an increased outer diameter and the joint central part has associated regions with a decreased outer diameter for receiving the balls of the first and second ball tracks, and the joint central part has regions with an increased outer diameter and the joint inner part has regions with a decreased outer diameter for receiving the balls of the third and fourth ball tracks. On account of this measure, the ball tracks are directly provided by the joint outer part as well as by the joint central part and the joint inner part, such that the use of inserts or else ball cages is dispensed with. Of course, it is also conceivable for ball cages to be used for the balls of the ball tracks. However, said ball cages may then be reduced to a minimum size, since the majority of guiding is ensured by the ball tracks of the joint outer part, joint central part or joint inner part, respectively. Then ball cages which are similar to those used in ball bearings may be employed, for example.

Preferably, the joint outer part, the joint central part, and/or the joint inner part in the regions with the increased or decreased outer diameter have a contact angle of more than 45° in relation to the balls disposed in the respective ball tracks. On account thereof, guiding of the balls is significantly improved and play of the connecting joint is thus significantly reduced, despite ball cages not being used.

Preferably, the ball tracks have an elliptical cross section or one of mirrored pointed arches, for example. On account thereof, the running face or the contact line, respectively, of the balls in the ball tracks may be reduced to a few points, for example two contact points, and overall friction may thus be reduced.

If and when the joint outer part, the joint central part, and/or the joint inner part are manufactured from rotationally symmetrical circular blanks, tube portions, or extrusion-press blanks by way of forming, preferably while applying roller spinning, those regions which are provided for the ball tracks have typical radii without pointed edges and corners, such as are created as a rule in mechanical forming. These radii lead to the bearing pressure of the balls under load being able to be absorbed in an improved manner Tension peaks at the run-out of the ball track are reduced or avoided, respectively. Moreover, the ball tracks may also be manufactured in a simple manner by way of highly integrated processes, such as roller spinning, for example, without any subtractive machining of a solid blank being necessary. Subtractive machining operations indeed have the problem that sharp edges and protrusions have to be removed or bent, respectively, in order to reduce tension peaks. These are additional expensive operating steps. In contrast, forming as a rule creates a smooth surface with low friction values. Apart from roller spinning, other methods for mechanically forming tubular blanks or circular or extrusion-press blanks, respectively, may of course also be considered, for example, pultrusion, roll-forming, etc.

Preferably, the joint outer part, the joint central part, and/or the joint inner part after forming are/is partially or completely heat treated. On account thereof, strength values of the used joint outer parts, joint central parts, and joint inner parts which enable higher force transmission can be achieved, on the one hand. On the other hand, lower wear of the connecting joint results too.

In order to further improve guiding of the connecting joint, according to a further embodiment at least two of the ball tracks are in each case configured as two ball tracks which run parallel with one another, such that the guiding properties of these double ball tracks which run parallel with one another are further improved. On the one hand, torque transmission by way of the ball tracks which run parallel with one another succeeds in a significantly improved manner, on the other hand, on account of the use of the ball tracks which run parallel with one another, friction does not increase in an excessive manner, such that in particular increased torque transmission is ensured for the connecting joint, in particular if and when all four ball tracks are in each case configured as ball tracks which run parallel with one another.

The joint outer part as well as the joint inner part may be configured so as to be integral with the first or the second rotating shaft, on the one hand. On the other hand, according to an advantageous embodiment of the connecting joint on the end of the joint outer part which faces in the direction of the first rotating shaft, and/or on the end of the joint inner part which faces in the direction of the second rotating shaft, a joint journal which optionally has securing means for connecting to the first and the second rotating shaft, respectively, is provided. On account of the joint journal the respective joint parts, that is to say the joint outer part or the joint inner part, may be connected in a form-fitting manner to the rotating shaft in such a manner that an unintentional release of the connecting joint from the rotating shaft can be avoided, on the one hand. On the other hand, the joint journal may have a toothing, for example, in order to ensure very good torque transmission to the rotating shaft.

Various embodiments of the present disclosure are discussed in further detail below with reference to the attached drawing figures.

Figure 1:
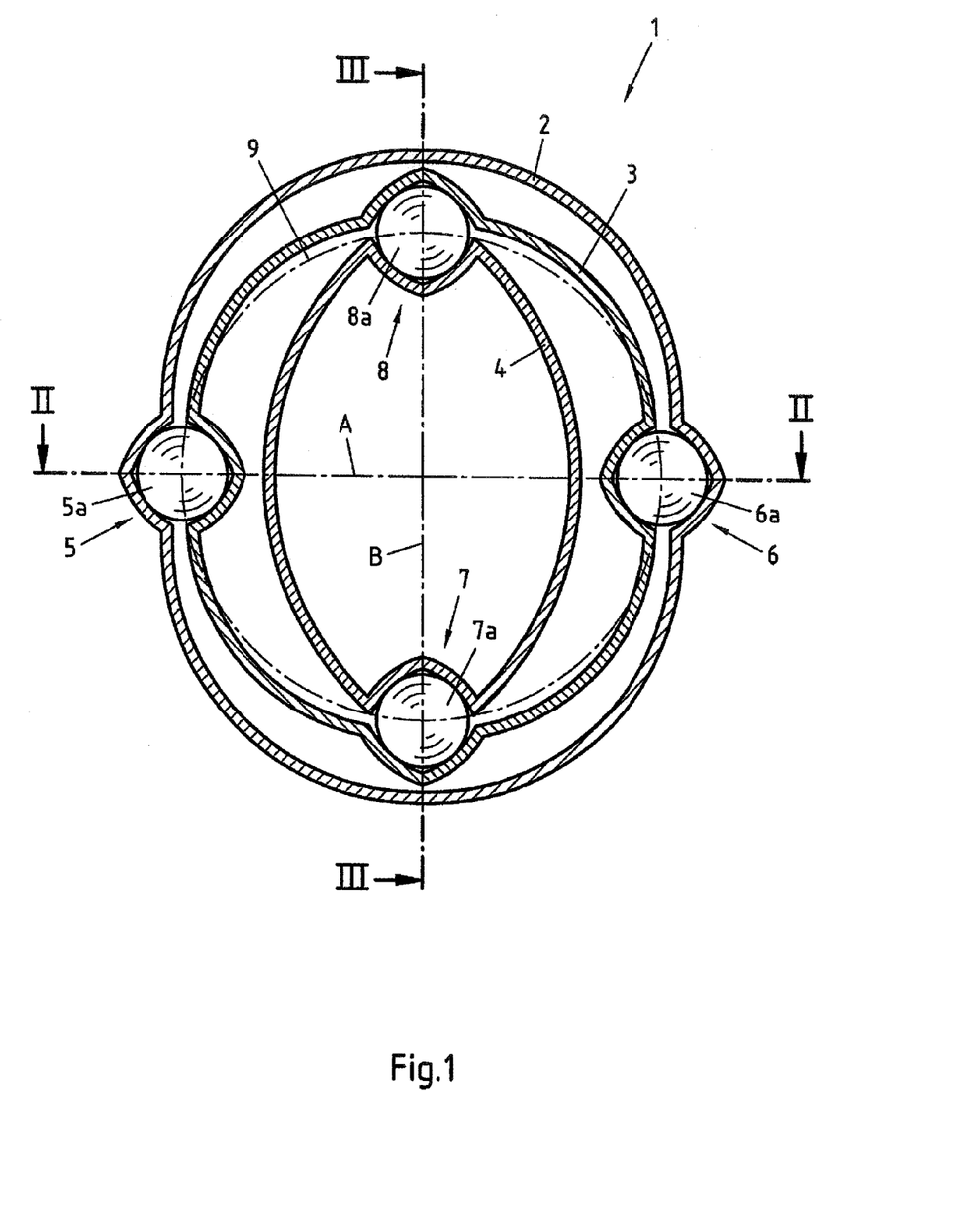
FIG. 1 is a radial section view of an embodiment of a connecting joint of the present disclosure.

In FIG. 1 a first exemplary embodiment of a connecting joint 1 according to the invention is initially illustrated in a schematic radial sectional view. The connecting joint 1 has a joint outer part 2, a joint central part 3, and a joint inner part 4. By way of a first and a second ball track 5, 6, the joint outer part 2 is mounted so as to be pivotable about the axis A in relation to the joint central part 3. Moreover, by way of the third and fourth ball tracks 7, 8, the joint inner part 4 is mounted on the joint central part 3 in such a manner that the joint inner part 4 can be pivoted about the pivot axis B in relation to the joint central part. Both pivot axes A and B have an angle of 90° in relation to one another. As can be seen in FIG. 1, in the exemplary embodiment of the connecting joint illustrated in FIG. 1, in total only four ball tracks 5, 6, 7, 8 are required for transmitting the rotation movement of the first rotating shaft to the second rotating shaft, on the one hand, and for enabling simultaneously a bending angle by pivoting in relation to the axis A and B, on the other hand.

As can likewise be seen in the exemplary embodiment illustrated in FIG. 1, the connecting joint 1 is manufactured from a metal-sheet type material and not from a solid material. Therefore, in comparison with connecting joints known from the prior art, which mostly have a solid material or an almost solid material, said connecting joint 1 is particularly lightweight. Preferably, circular blanks, tube portions, or extrusion-press blanks which are mechanically formed, for example by roller spinning or roll-forming, for example, are used.

The joint outer part, joint central part, and joint inner part preferably are manufactured from extrusion-press blanks, circular blanks, or tubular hollow bodies by way of mechanical forming, for example roller spinning Roller spinning is a preferred manufacturing method by way of which in particular also various wall thicknesses in the various regions can be implemented without problems. The connecting joint 1 according to the invention here does not rely on additional measures in the region of the ball tracks; this means that no ball cages are required in principle for implementing the connecting joint. However, it is also conceivable for particularly simple ball cages which are similar to the ball cages of a ball bearing to be employed.

Preferably, the regions of the joint outer part 2, of the joint central part 3, and of the joint inner part 4, in which the ball tracks are provided, are heat treated after forming. On account thereof, a particularly low susceptibility to wear is made possible and simultaneously it is possible to ensure transmission of comparatively high torques. In order to achieve force transmission or torque transmission, respectively, which is as uniform as possible, the balls 5a, 6a, 7a, 8a of the ball tracks 5, 6, 7, 8 are disposed on a common radius 9.

Figure 2:
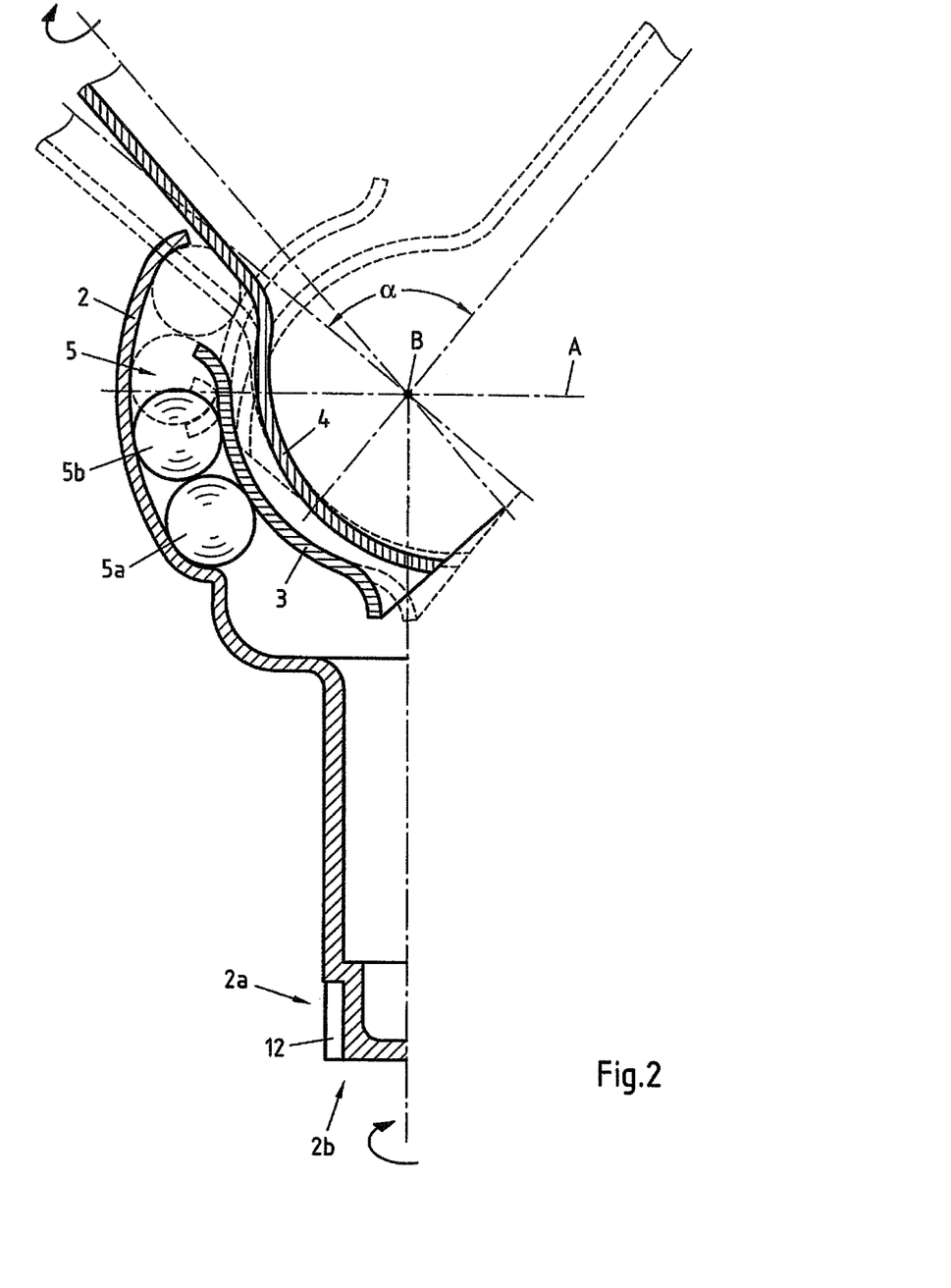
FIG. 2 is a section view of the embodiment of FIG. 1, about section line II.

FIG. 2, in a schematic sectional view along the section axis II, shows that two balls 5a, 5b which are disposed between the joint outer part 2 and the joint central part 3 are provided in the ball track 5. The joint central part 3 is disposed so as to be pivotable by at least 40° about the pivot axis B which projects from the drawing plane, such that the maximum pivot angle α is at least 80°. During pivoting of the joint central part, including the joint inner part, about the pivot axis B, the balls 5a and 5b change their position, as is indicated in FIG. 2 by dashed lines.

Figure 3:
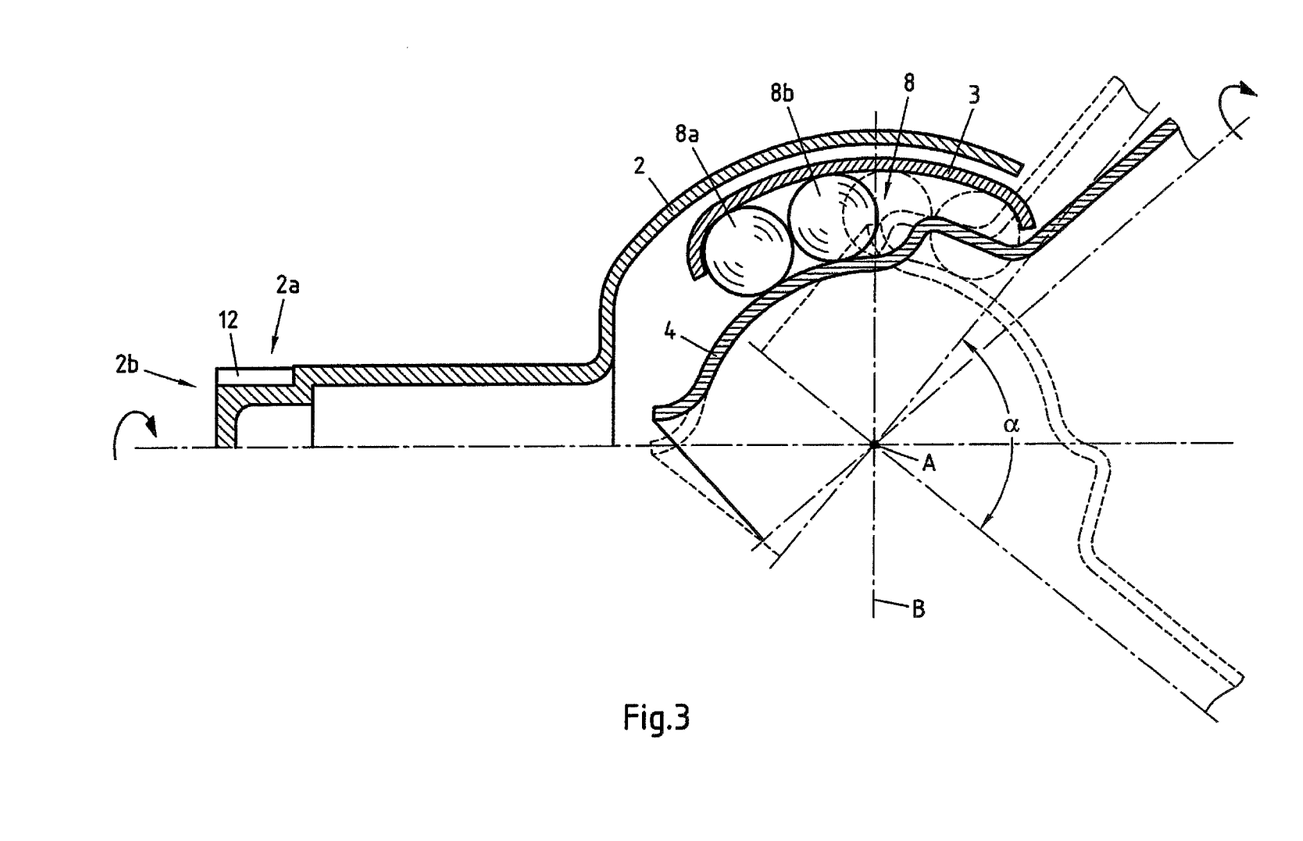
FIG. 3 is a section view of the embodiment of FIG. 1, about section line III.

A schematic sectional view of the first exemplary embodiment along the section axis III is now illustrated in FIG. 3, wherein the balls 8a, 8b are disposed in such a manner between the joint inner part 4 and the joint central part 3 that said balls 8a, 8b a ball track 8 in which the former can move in relation to the joint central part. The joint inner part 4 can be pivoted by at least 40° about the pivot axis A which projects from the drawing plane, such that the maximum pivot angle α about the pivot axis A is at least 80°.

It is furthermore illustrated in FIG. 3 that the end of the joint outer part 2a which faces in the direction of the first rotating shaft has a joint journal 2b which has a toothing 12, for example, by way of which said joint journal 2b may be connected in a form-fitting manner to a rotating, driven part, for example to a gearbox.

Figure 4:
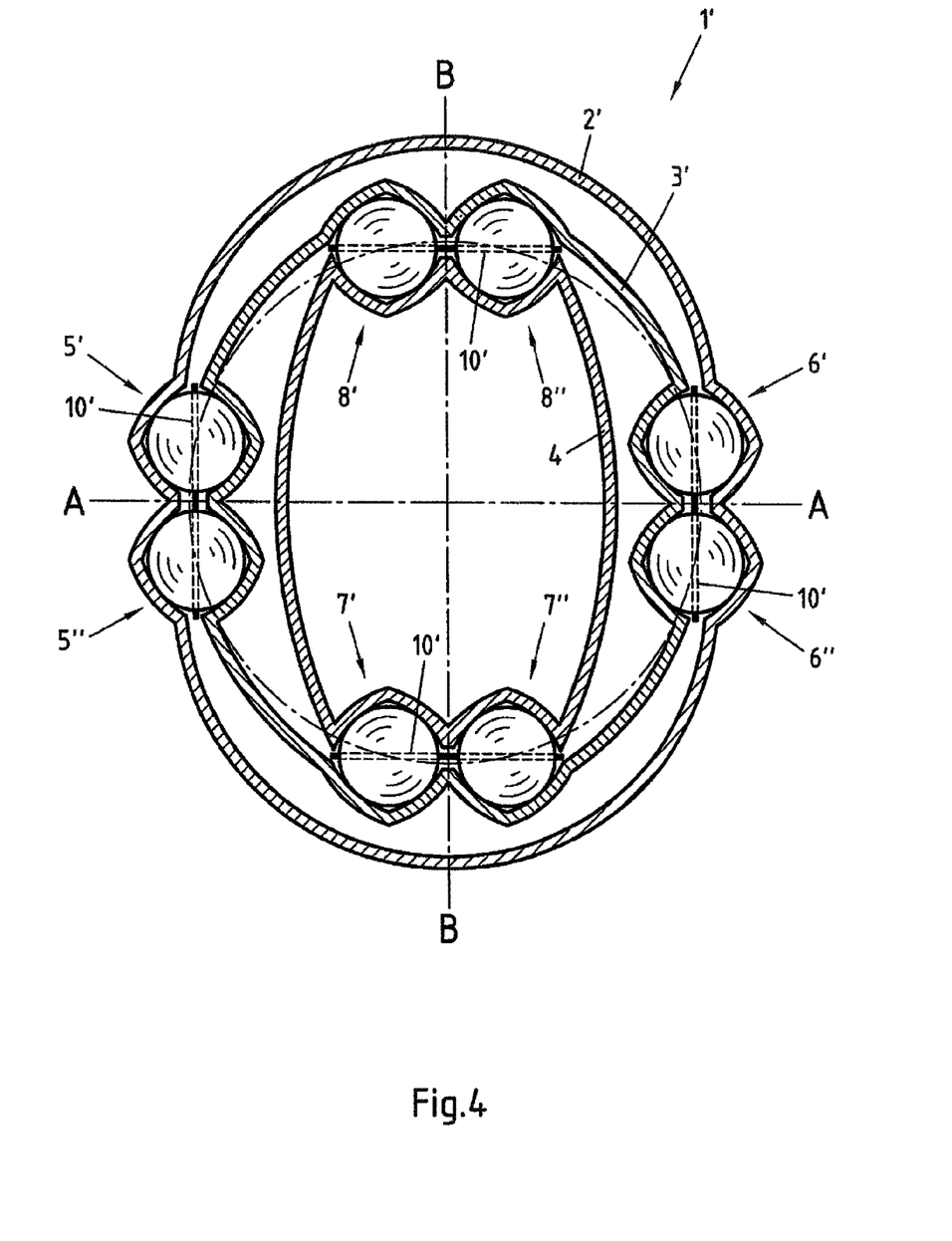
FIG. 4 is a radial section view of an alternate embodiment of a connecting joint of the present disclosure, having in each case two ball tracks that run parallel to one another.

A radial sectional view of a second exemplary embodiment, which differs from the first exemplary embodiment in FIG. 1 in that henceforth in each case two parallel ball tracks 5', 5", 6', 6", 7', 7", 8', 8" instead of a single ball track are provided in order to make possible the pivot movement about the pivot axes A and B, is now illustrated in FIG. 4. Moreover, as has already been stated, said two parallel ball tracks serve for transmitting the torques from the first rotating shaft by way of the joint outer part 2', the joint central part 3' to the joint inner part 4' and thus to the second rotating shaft. In FIG. 4 a ball cage which may be used for providing the balls in the ball tracks, for example, is indicated using the reference sign 10'. However, the present exemplary embodiment both in FIG. 1 as well as in FIG. 4 does not require a ball cage.

Figure 5A:
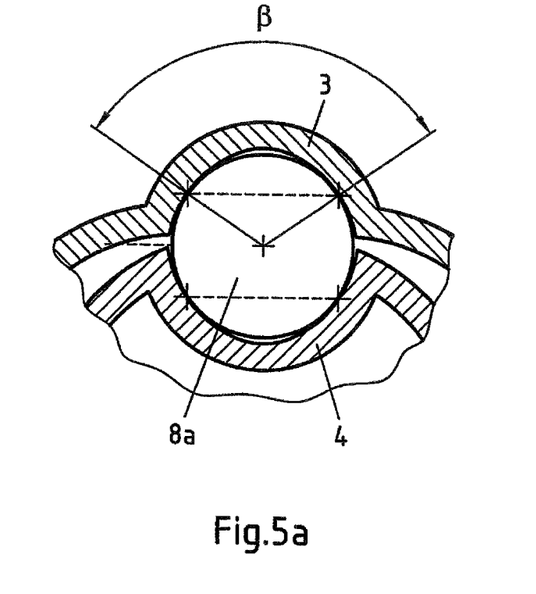
FIG. 5a is a detail section view of an embodiment of a ball track of the present disclosure, showing a first ball track cross sectional shape.
Figure 5B:
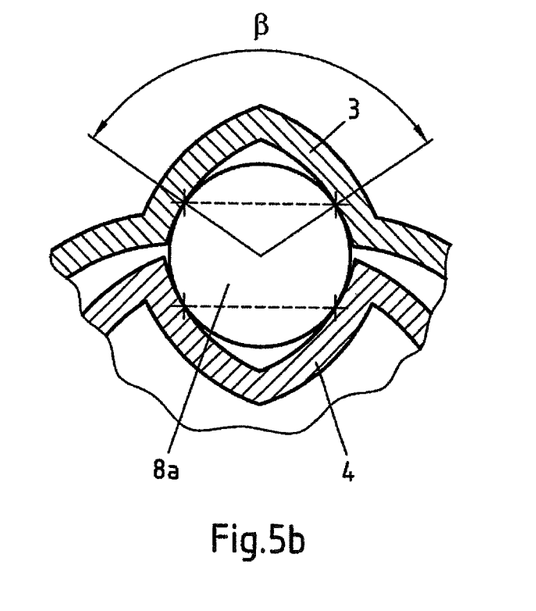
FIG. 5b is a detail section view of an alternate embodiment of a ball track of the present disclosure, showing an alternate second ball track cross sectional shape.

Various embodiments of the ball-track cross sections are shown in FIG. 5a) and FIG. 5b). For example, FIG. 5a) illustrates the ball 8a of the first exemplary embodiment from FIG. 1. The joint central part 3, together with the joint inner part 4, here forms a ball track 8 having an elliptical cross section. On account thereof, the ball is supported merely by two contact lines which in the sectional view are illustrated between the two crosses and to this extent has particularly low friction values. The same may be achieved by one ball track which has a cross section having the shape of a mirrored pointed arch, FIG. 5b). Here, likewise merely two annular contact surfaces or contact lines, respectively, which guide the ball are configured. On account thereof, play of the balls in the ball tracks is reduced, and simultaneously friction of the balls in the ball tracks is kept as low as possible.

As is illustrated in FIGS. 5a) and 5b), the joint central part 3 and the joint inner part 4 in the regions with the increased or decreased outer diameter have a contact angle β of more than 45° in relation to the balls, for example the ball 8a, disposed in the respective ball tracks. This also applies to the joint outer part 2 and to the joint central part 3 and the associated balls 5a, 6a in the respective ball tracks 5, 6, such that the balls are guided in a particularly precise manner in the ball tracks.

The invention claimed is:

1. A connecting joint for transmitting a rotation movement from a first to a second rotating shaft, comprising:
    a joint outer part configured to be coupled to the first rotating shaft;
    a joint inner part disposed at least partially within said joint outer part and configured to be coupled to the second rotating shaft;
    a joint central part disposed between and operatively coupled to said joint outer part and said joint inner part;
    a first ball track and a second ball track defined between said joint outer part and said joint central part;
    a third ball track and a fourth ball track defined between said joint inner part and said joint central part;
    a plurality of balls disposed in each of said first, second, third, and fourth ball tracks that are configured to change their respective position in relation to at least one of said joint outer, inner, or central parts, wherein
        said balls in said ball tracks are disposed about a common radius in a radial plane of the connecting joint,
        said joint outer part is pivotable with respect to said joint central part about a first pivot axis (A) by said balls disposed in at least said first and said second ball tracks,
        said joint inner part is pivotable with respect to said joint central part about a second pivot axis (B) by said balls disposed in at least said third and said fourth ball tracks,
        said first pivot axis (A) being oriented at an angle of 90° with respect to said second pivot axis (B), and
        rotational movement of either of said joint inner or outer part is transmitted, by said plurality of balls disposed in each of said ball tracks, to said joint central part, and further to the other of said joint inner or outer part.

2. The connecting joint of claim 1, wherein at least two balls are provided in each of said first, second, third, and fourth ball tracks.

3. The connecting joint of claim 1, wherein said ball tracks are configured to permit at least one of said joint outer part and said joint inner part to be pivotable by an angle of at least 40° in each pivoting direction about the first pivot axis (A) and the second pivot axis (B).

4. The connecting joint of claim 1, wherein
    said joint outer part includes a plurality of first grooves defined in an interior surface thereof and said joint central part includes a plurality of complementary second grooves defined in an exterior surface thereof, which first and second grooves together define said first and second ball tracks in which said balls are disposed therein, and
    said joint central part further includes a plurality of third grooves defined in an interior surface thereof and said joint inner part includes a plurality of complementary fourth grooves defined in an exterior surface thereof, which third and fourth grooves together define said third and fourth ball tracks in which said balls are disposed therein.

5. The connecting joint of claim 1, wherein one or more of said joint outer part, central part, or inner part is manufactured from at least one of rotationally symmetrical circular blanks, tube portions, or extrusion-press blanks.

6. The connecting joint of claim 1, wherein one or more of said joint outer part, central part, or inner part are heat treated.

7. The connecting joint of claim 1, wherein at least two of said first, second, third, or fourth ball tracks are each configured as double-track ball tracks having two tracks running adjacent and parallel to each other.

8. The connecting joint of claim 1, wherein at least one of said joint outer part or said joint inner part has an end facing the respective first or second rotating shaft, on which end is disposed a joint journal configured to connect to the respective first or second rotating shaft.

9. A connecting joint for transmitting a rotation movement from a first to a second rotating shaft, comprising:
a joint outer part configured to be coupled to the first rotating shaft;
a joint inner part disposed at least partially within said joint outer part and configured to be coupled to the second rotating shaft;
a joint central part disposed between and operatively coupled to said joint outer part and said joint inner part;
a first ball track and a second ball track defined between said joint outer part and said joint central part;
a third ball track and a fourth ball track defined between said joint inner part and said joint central part;
a plurality of balls disposed in each of said first, second, third, and fourth ball tracks that are configured to change their respective position in relation to at least one of said joint outer, inner, or central parts, wherein
said joint outer part is pivotable with respect to said joint central part about a first pivot axis (A) by said balls disposed in at least said first and said second ball tracks,
said joint inner part is pivotable with respect to said joint central part about a second pivot axis (B) by said balls disposed in at least said third and said fourth ball tracks,
said first pivot axis (A) being oriented at an angle of 90° with respect to said second pivot axis (B),
rotational movement of either of said joint inner or outer part is transmitted, by said plurality of balls disposed in each of said ball tracks, to said joint central part, and further to the other of said joint inner or outer part, and
the first, second, third, and fourth ball tracks have a contact angle of more than 45° in relation to said balls that are disposed in said respective ball tracks.

10. The connecting joint of claim 9, wherein at least two balls are provided in each of said first, second, third, and fourth ball tracks.

11. The connecting joint of claim 9, wherein said ball tracks are configured to permit at least one of said joint outer part and said joint inner part to be pivotable by an angle of at least 40° in each pivoting direction about the first pivot axis (A) and the second pivot axis (B).

12. The connecting joint of claim 9, wherein said balls in said ball tracks are disposed about a common radius in a radial plane of the connecting joint.

13. The connecting joint of claim 9, wherein
said joint outer part includes a plurality of first grooves defined in an interior surface thereof and said joint central part includes a plurality of complementary second grooves defined in an exterior surface thereof, which first and second grooves together define said first and second ball tracks in which said balls are disposed therein, and
said joint central part further includes a plurality of third grooves defined in an interior surface thereof and said joint inner part includes a plurality of complementary fourth grooves defined in an exterior surface thereof, which third and fourth grooves together define said third and fourth ball tracks in which said balls are disposed therein.

14. The connecting joint of claim 9, wherein one or more of said joint outer part, central part, or inner part is manufactured from at least one of rotationally symmetrical circular blanks, tube portions, or extrusion-press blanks.

15. The connecting joint of claim 9, wherein one or more of said joint outer part, central part, or inner part are heat treated.

16. The connecting joint of claim 9, wherein at least two of said first, second, third, or fourth ball tracks are each configured as double-track ball tracks having two tracks running adjacent and parallel to each other.

17. The connecting joint of claim 9, wherein at least one of said joint outer part or said joint inner part has an end facing the respective first or second rotating shaft, on which end is disposed a joint journal configured to connect to the respective first or second rotating shaft.

\* \* \* \* \*